US010830918B2

(12) United States Patent
Strachen et al.

(10) Patent No.: US 10,830,918 B2
(45) Date of Patent: Nov. 10, 2020

(54) MAGNETO-INDUCTIVE TRANSMITTER WITH ELECTRICALLY MODULATED RELUCTANCE

(71) Applicant: Wisconsin Alumni Research Foundation, Madison, MI (US)

(72) Inventors: Nathan Daniel Strachen, Madison, WI (US); Nader Behdad, Oregon, WI (US); John H. Booske, McFarland, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 188 days.

(21) Appl. No.: 16/030,364

(22) Filed: Jul. 9, 2018

(65) Prior Publication Data
US 2020/0012006 A1    Jan. 9, 2020

(51) Int. Cl.
*G01V 3/08*     (2006.01)
*G01V 3/10*     (2006.01)

(52) U.S. Cl.
CPC .............. *G01V 3/088* (2013.01); *G01V 3/10* (2013.01)

(58) Field of Classification Search
USPC ............... 324/654, 76.75, 207.15, 207.17, 324/207.24–207.27
See application file for complete search history.

(56) References Cited

U.S. PATENT DOCUMENTS

| 4,275,343 | A | * | 6/1981 | Fulton | H02P 25/024 |
| | | | | | 318/721 |
| 4,710,708 | A | | 12/1987 | Rorden et al. | |
| 5,589,775 | A | | 12/1996 | Kuckes | |
| 6,455,825 | B1 | * | 9/2002 | Bentley | G05D 23/26 |
| | | | | | 148/567 |
| 6,549,004 | B1 | | 4/2003 | Prigge | |
| 7,123,129 | B1 | * | 10/2006 | Schrott | G06K 19/0723 |
| | | | | | 340/10.1 |
| 7,573,258 | B2 | | 8/2009 | Anderson | |
| 7,864,394 | B1 | * | 1/2011 | Rule | B82Y 20/00 |
| | | | | | 359/241 |
| 7,903,041 | B2 | | 3/2011 | Levan | |
| 9,002,675 | B2 | | 4/2015 | Mcintyre et al. | |
| 2002/0196018 | A1 | * | 12/2002 | Wisler | G01N 24/081 |
| | | | | | 324/303 |

(Continued)

OTHER PUBLICATIONS

Strachen et al., Accurate Indoor Navigation with Spinning Magnets, IPSN Conference, Apr. 1, 2018, pp. 1-2.

(Continued)

*Primary Examiner* — Vincent Q Nguyen
(74) *Attorney, Agent, or Firm* — Bell & Manning, LLC

(57) ABSTRACT

A magneto-inductive transmit antenna is provided that includes a shield formed of a magnetic material, a magnetic field source mounted on a first side of the shield, and a coil wrapped around the shield to define a number of turns. The coil is configured to conduct a current therethrough. The magnetic material is configured to exhibit a change in permeability based on the current conducted through the coil when the current is conducted through the coil. The change in permeability is configured to modulate a magnetic field of the magnetic field source. The magnetic field is modulated relative to a second side of the shield opposite the first side when the permeability is changed.

20 Claims, 16 Drawing Sheets

(56) References Cited

U.S. PATENT DOCUMENTS

2013/0072117 A1     3/2013   Bourdage
2013/0196593 A1     8/2013   Roper et al.

OTHER PUBLICATIONS

Mu-metal, Wikipedia, https://en.wikipedia.org/wiki/Mu-metal, printed May 8, 2018, pp. 1-4.
Deane, Jonathan H.B., Modeling the Dynamics of Nonlinear Inductor Circuits, IEEE Transactions on Magnetics. vol. 30, No. 5, Sep. 1994, pp. 2795-2801.
Permalloy, Wikipedia, https://en.wikipedia.org/wiki/Permalloy, printed May 8, 2018, pp. 1-4.
Supermalloy, Wikipedia, https://en.wikipedia.org/wiki/Supermalloy, printed May 8, 2018, pp. 1.
Strachen et al., Mechanical Super-Low Frequency (SLF) Transmitter Using Electrically-Modulated Reluctance, APS/URSI 2018, Jul. 9, 2018, pp. 1-2.

\* cited by examiner

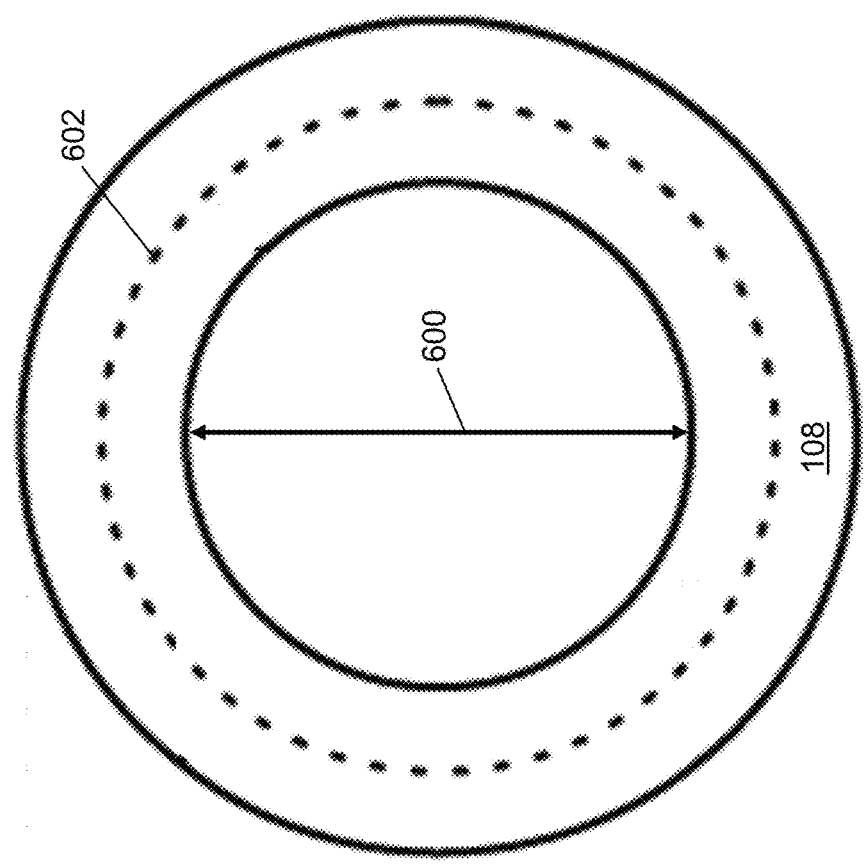
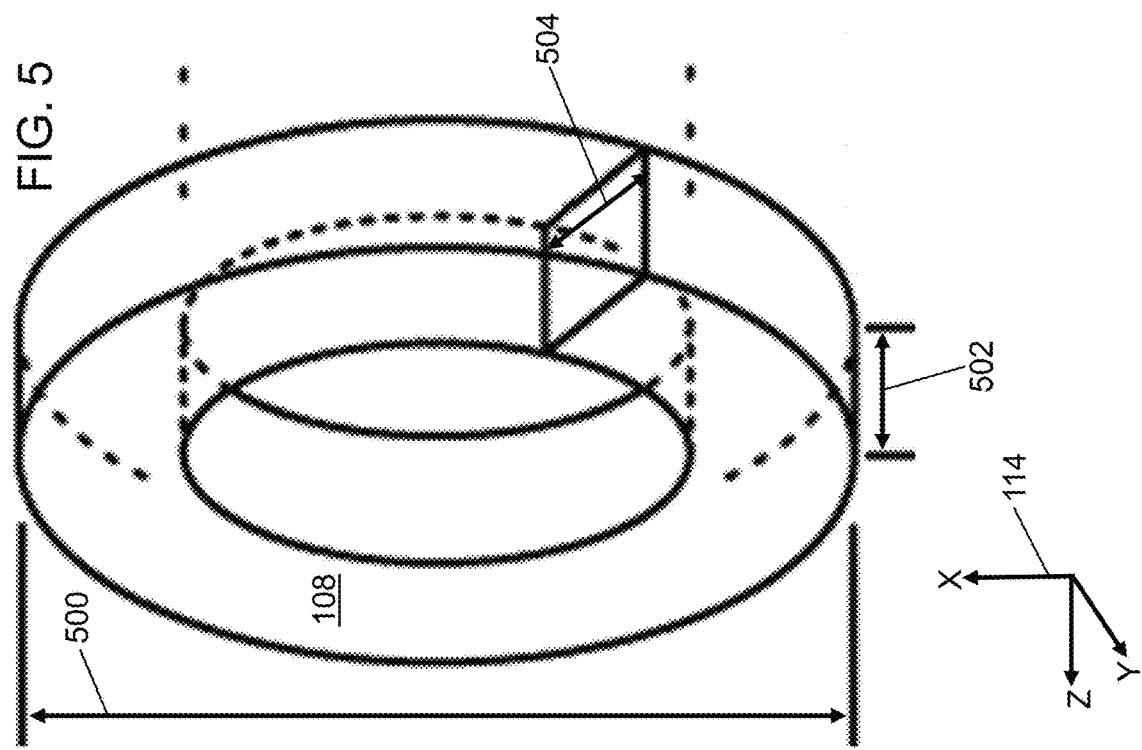

MAGNETO-INDUCTIVE TRANSMITTER WITH ELECTRICALLY MODULATED RELUCTANCE

REFERENCE TO GOVERNMENT RIGHTS

This invention was made with government support under N00014-15-1-2207 awarded by the NAVY/ONR. The government has certain rights in the invention.

BACKGROUND

Frequency bands from super-low frequency (SLF) to very low frequency (VLF) in the range of 30-300 hertz (Hz) and 3-30 kilohertz (kHz), respectively, have numerous applications in underground and underwater communications. Magneto-inductive (MI) communication can be used for wireless communication in underwater and underground environments because MI communication uses low frequency, quasi-static (non-propagating) alternating current (AC) electromagnetic fields. The quasi-static near field of these frequencies does not suffer from high attenuation, reflection, or multipath propagation. MI communication depends primarily on the magnetic permeability of the channel medium. Water, rock, and soil in general have permeabilities close to that of air making MI communication a very good choice for communicating in harsh environments where other technologies are unreliable. As a result, the physical properties of magnetic fields enable these systems to operate through any natural medium or medium boundary.

Conventionally, coiled loops or solenoids are used to generate a low frequency magnetic moment, but these are bulky and inefficient. However, recent methods have utilized a rotating permanent magnet to generate a magnetic moment. Very strong magnetic moments are generated in a small volume with permanent magnets making this an attraction option for compact designs. Mechanically changing a rotational speed of the magnet has been suggested as a modulation method, however, this method can result in high power consumption and low bandwidth.

SUMMARY

In an illustrative embodiment, a magneto-inductive transmit antenna is provided. The magneto-inductive transmit antenna includes, but is not limited to, a shield formed of a magnetic material, a magnetic field source mounted on a first side of the shield, and a coil wrapped around the shield to define a number of turns. The coil is configured to conduct a current therethrough. The magnetic material is configured to exhibit a change in permeability based on the current conducted through the coil when the current is conducted through the coil. The change in permeability is configured to modulate a magnetic field of the magnetic field source. The magnetic field is modulated relative to a second side of the shield opposite the first side when the permeability is changed.

In another illustrative embodiment, a transmitter is provided. The transmitter includes, but is not limited to, a signal generator, a motor shaft, a motor, and a magneto-inductive transmit antenna. The signal generator is configured to generate a signal. The motor is mounted to rotate the motor shaft when the transmitter is used. The magneto-inductive transmit antenna includes, but is not limited to, a shield formed of a magnetic material, a permanent magnet mounted on a first side of the shield and to the motor shaft to rotate with the motor shaft, and a coil wrapped around the shield to define a number of turns. The coil is configured to conduct a current therethrough based on the generated signal. The magnetic material is configured to exhibit a change in permeability based on the current conducted through the coil when the current is conducted through the coil. The change in permeability is configured to modulate a magnetic field of the permanent magnet. The magnetic field is modulated relative to a second side of the shield opposite the first side when the permeability is changed.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 5 depicts a perspective top view of the magnetic shield in accordance with an illustrative embodiment.

FIG. 6 depicts a top view of the magnetic shield of FIG. 5 in accordance with an illustrative embodiment.

DETAILED DESCRIPTION

Figure 1:
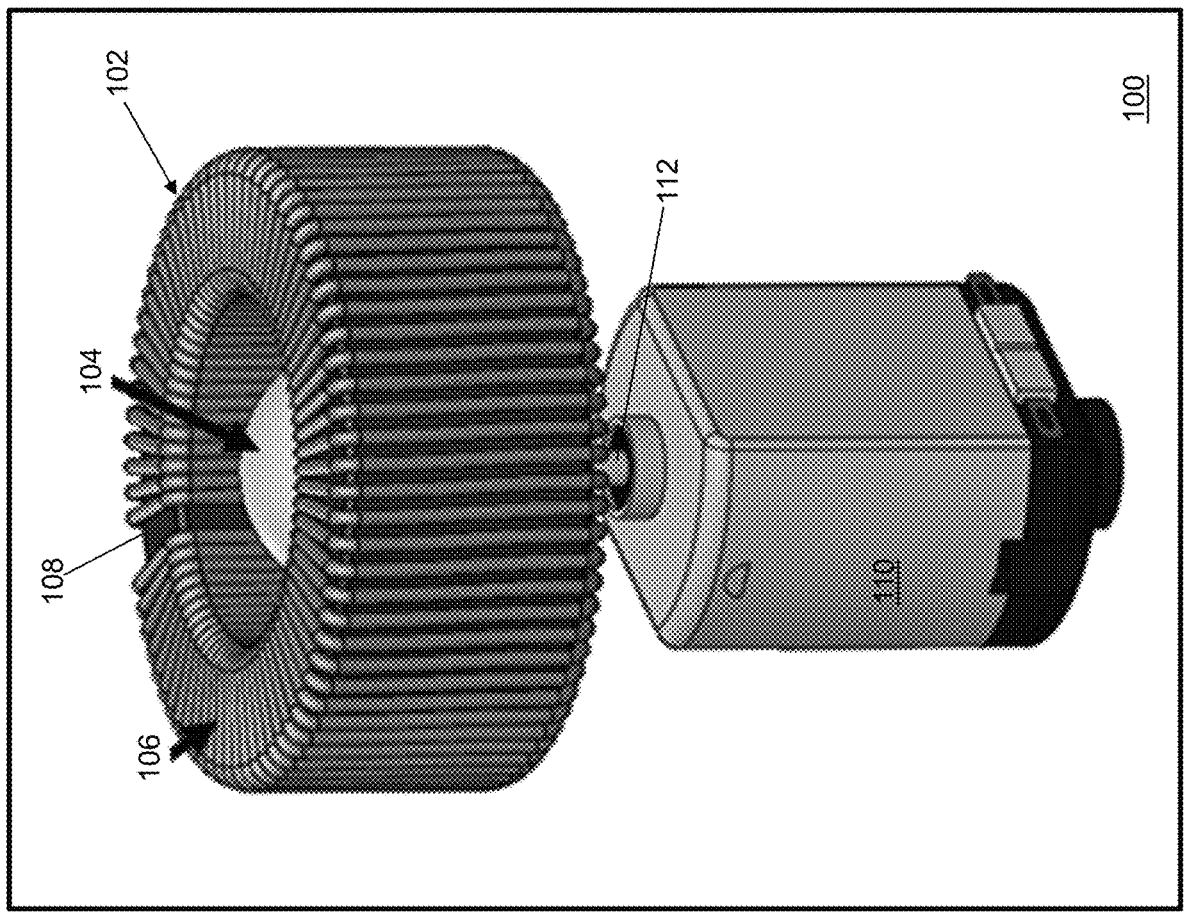
FIG. 1 depicts a perspective side view of a transmitter in accordance with an illustrative embodiment.
Figure 3:
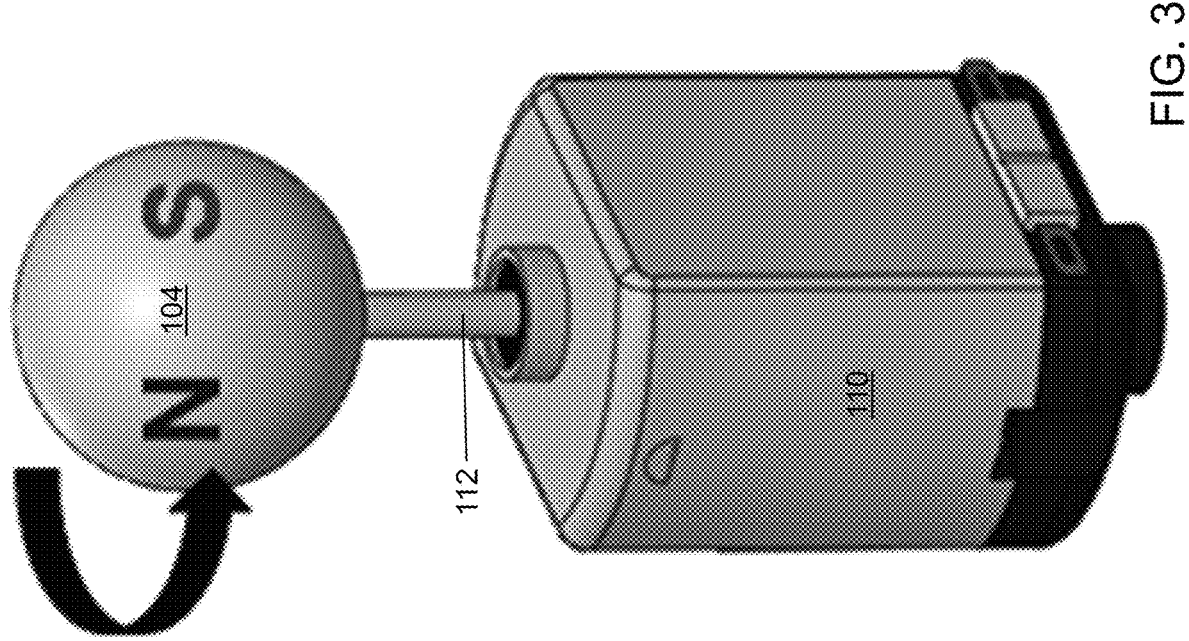
FIG. 3 depicts a perspective side view of the permanent magnet and motor of the transmitter of FIG. 1 in accordance with an illustrative embodiment.

With reference to FIG. 1, a perspective side view of a transmitter 100 is shown in accordance with an illustrative embodiment. Transmitter 100 may include a controller 800 (shown referring to FIG. 8), magneto-inductive (MI) transmit antenna 102, a motor 110, and a motor shaft 112. Motor 110 is mounted to motor shaft 112 and is configured to rotate motor shaft 112. MI transmit antenna 102 may include a permanent magnet 104, an inductive coil 106, and a magnetic shield 108. Permanent magnet 104 is mounted to motor shaft 112 to rotate with motor shaft 112 under control of motor 110. A motor controller (not shown) may control an operation of motor 110. For example, the motor controller is configured to control a rotational speed of motor shaft 112. Of course, if the rotational speed is not changed, no controller is needed. Referring to FIG. 3, a perspective side view of permanent magnet 104 mounted to motor shaft 112 for rotation is shown in accordance with an illustrative embodiment.

Magnetic shield 108 is formed of a magnetic material that circumferentially surrounds permanent magnet 104. Inductive coil 106 is wrapped around magnetic shield 108 to define a number of turns. Inductive coil 106 is electrically connected to signal generator 802 to receive a current signal and is configured to conduct a current therethrough based on the received current signal. The magnetic material of magnetic shield 108 is configured to exhibit a change in permeability based on the current conducted through inductive coil 106 when the current is conducted through inductive coil 106. The change in permeability is configured to modulate a magnetic field of permanent magnet 104 as discussed further below.

Figure 2:
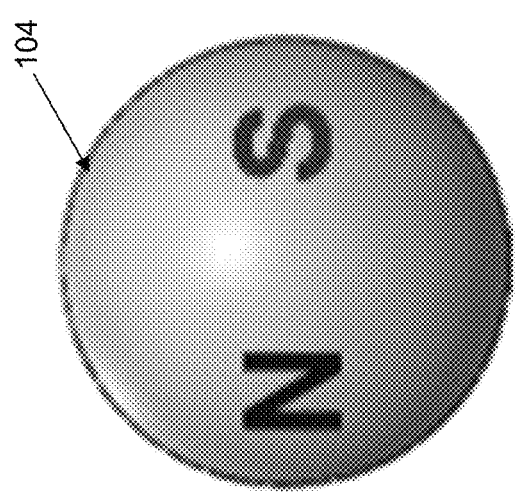
FIG. 2 depicts a perspective side view of a permanent magnet of the transmitter of FIG. 1 in accordance with an illustrative embodiment.

Referring to FIG. 2, a perspective side view of permanent magnet 104 is shown in accordance with an illustrative embodiment. Permanent magnet 104 is diametrically magnetized to form a south pole "S" (indicated with "S") on a first side and a north pole "N" (indicated with "N") on a second side opposite the first side. Permanent magnet 104 may be formed of rare earth magnets, such as neodymium and dysprosium, of ferrite-based magnets, etc. In the illustrative embodiment of FIGS. 1 and 2, permanent magnet 104 has a spherical shape though other shapes such as an oblate spheroid or a cylinder with a circular cross section in an x-y plane defined by an x-direction and a y-direction and elongated in a z-direction may be used in alternative embodiment cross section. In the alternative embodiment, a length in the z-direction may be longer than, shorter than, or the same as a length in either the x-direction and/or the y-direction. The x-direction is perpendicular to the y-direction, and both the x-direction and the y-direction are perpendicular to the z-direction to form a right-handed coordinate reference frame denoted x-y-z frame 114. A size, shape, and material for permanent magnet 104 may be selected to achieve a desired magnetic field strength at a desired distance from permanent magnet 104.

Permanent magnet 104 is diametrically magnetized with respect to an axis of rotation. For example, in the illustrative embodiment of FIGS. 1 to 3, permanent magnet 104 is diametrically magnetized with respect to the z-axis, which is the axis of rotation of permanent magnet 104 defined by an orientation of motor shaft 112. In alternative embodiments, permanent magnet 104 may be diametrically magnetized with respect to a different axis of rotation such as the x-axis.

Referring again to FIG. 1, magnetic shield 108 has a toroid shape that radially surrounds permanent magnet 104 located within a donut hole formed by the toroid shape of magnetic shield 108. In general, magnetic shield 108 should be far enough from permanent magnet 104 such that its magnetic field does not pre-saturate magnetic shield 108 yet close enough such that it presents a low reluctance path for shielding with the current off and have a vertical length similar to permanent magnet 104.

In alternative embodiments, magnetic shield 108 may not surround permanent magnet 104. For example, magnetic shield 108 may be flat or arc shaped to partially block or partially surround permanent magnet 104. Permanent magnet 104 is positioned on a first side of magnetic shield 108 such that the magnetic field of permanent magnet 104 is modulated relative to a second side of magnetic shield 108.

Figure 4:
FIG. 4 depicts a perspective side view of a magnetic shield and an inductive coil of the transmitter of FIG. 1 in accordance with an illustrative embodiment.

Referring to FIG. 4, inductive coil 106 is shown in accordance with an illustrative embodiment to better describe the physical characteristics. Inductive coil 106 may be formed of a conductive material such as copper plated steel, silver plated steel, silver plated copper, silver plated copper clad steel, copper, copper clad aluminum, steel, etc. A first end 400 of inductive coil 106 is connected to a first connector (not shown). A second end 402 of inductive coil 106 is connected to a second connector (not shown). Current flows through inductive coil 106 between first end 400 and second end 402 under control of signal generator 802. In the illustrative embodiment of FIG. 4, inductive coil 106 is formed of wire wound around magnetic shield 108 to form twenty turns though the number of turns may be selected based on a desired magnetic flux density and a desired current magnitude. A thickness and a material of inductive coil 106 also may be selected based on the desired magnetic flux density and the desired current magnitude. A cross section of inductive coil 106 may be circular, elliptical, polygonal, or combinations thereof.

Referring to FIGS. 4, 5, and 6, magnetic shield 108 is shown in accordance with an illustrative embodiment. In the illustrative embodiment of FIGS. 4, 5, and 6, magnetic shield 108 has a generally square cross section in an x-z plane defined by the x-direction and the z-direction (also in an y-z plane defined by the y-direction and the z-direction). The cross section of magnetic shield 108 in the x-z plane and the y-z plane may have rounded corners.

In the illustrative embodiments, magnetic shield 108 has a circular cross-sectional shape when projected into the x-y plane though magnetic shield 108 may have any cross-sectional shape when projected into the x-y plane including a polygon as well as an ellipse. The dimensions of magnetic shield 108 include an outer width 500 (outer diameter when magnetic shield 108 has a circular cross-sectional shape when projected into the x-y plane), a hole width 600 (hole diameter when magnetic shield 108 has a circular cross-sectional shape when projected into the x-y plane), a height 502 in the z-direction, and a core width 504. Magnetic shield 108 may be formed of laminations mounted closely together circumferentially, radially, or in the x-y plane.

Magnetic shield 108 is driven in and out of magnetic saturation to act as a shutter for permanent magnet 104 that is spinning under control of motor 110. The magnetic material of magnetic shield 108 has a high permeability so that it is effective at shielding the magnetic fields of permanent magnet 104 and a low loss for efficiency. For example, the magnetic material of magnetic shield 108 may have a relative permeability greater than that of air. Air has a permeability of approximately 1.25663753 Henries/meter (H/m) or a relative permeability equal to 1.00000037 relative to a vacuum, where $\mu_0=4\pi 10^{-7}$ H/m is a permeability of free space (a vacuum). In another illustrative embodiment, the magnetic material of magnetic shield 108 may have a relative permeability greater than 8,000 relative to a vacuum.

Illustrative materials include a mu-metal, a permalloy, a supermalloy, etc. Mu-metal is a nickel-iron soft ferromagnetic alloy with very high permeability. Permalloy is an alloy of nickel and iron that is easily magnetized and demagnetized. Supermalloy is an alloy composed of nickel, iron, and molybdenum. Various proprietary formulations of mu-metal, of permalloy, and of supermalloy are sold under various trade names such as MuMETAL®, Co-Netic® AA, Co-Netic® B, Netic® sold by Magnetic Shield Corporation, Perfection Mica Company, Bensenville, Ill., USA; Permalloy 80 sold by ESPI metals of Ashland, Oreg., USA; etc.

By changing the current that flows through inductive coil 106, the permeability of magnetic shield 108 changes in accordance with a B-H curve that defines a magnetic flux density (B) as a function of a magnetic field strength (H) of the magnetic material. A change in the permeability changes the effectiveness of the magnetic material in shielding the magnetic fields of permanent magnet 104. A relative permeability $\mu_r$ is a ratio of an absolute permeability and a permeability of free space (a vacuum) and is not a constant for ferromagnetic materials but is a function of the magnetic field strength (H) thereby defining the magnetic flux density (B) as: $B=\mu_0\mu_r H$.

Figure 7:
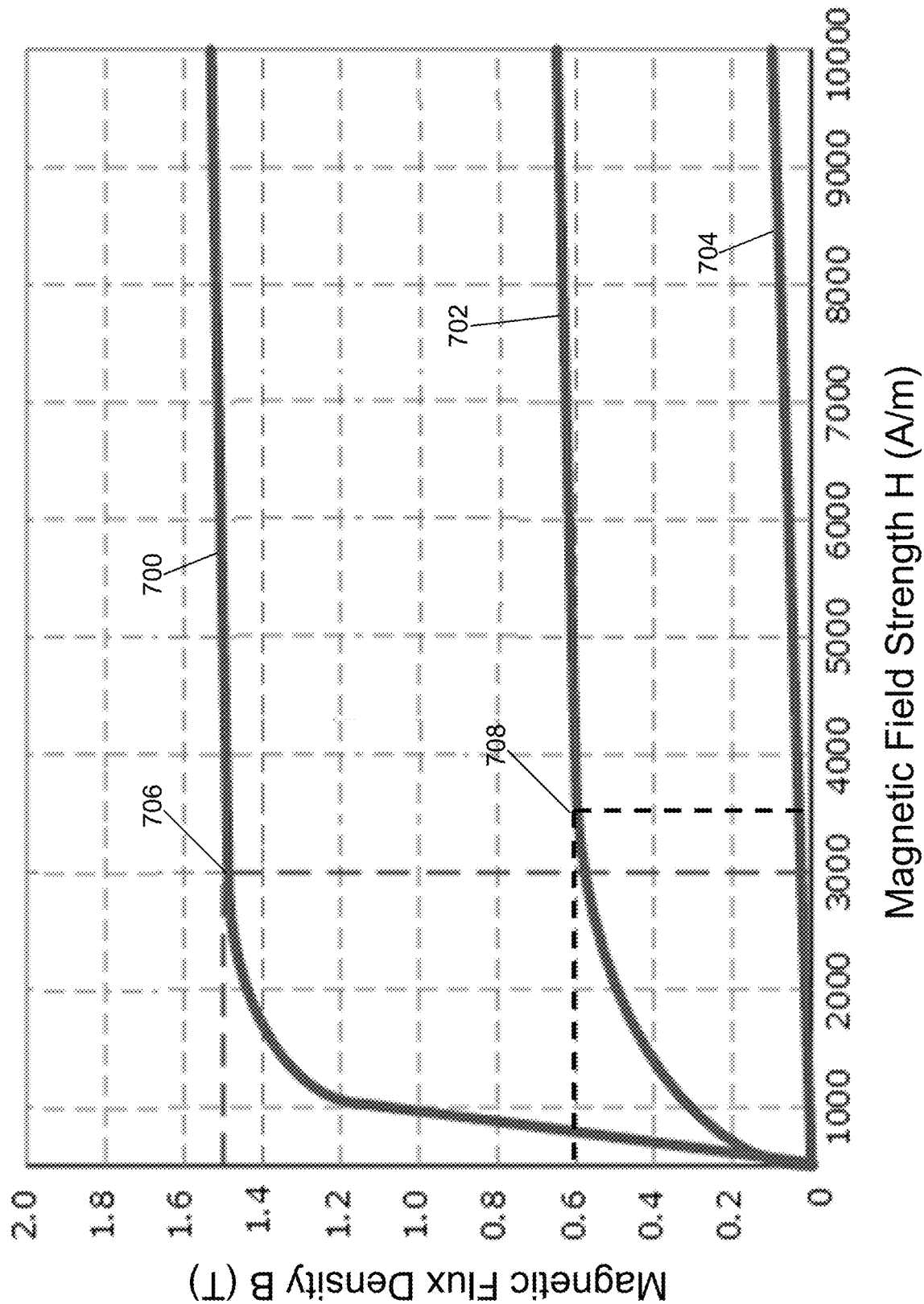
FIG. 7 depicts a magnetic flux density as a function of a magnetic field strength for several illustrative materials.

For illustration, referring to FIG. 7, a magnetic flux density (B) as a function of a magnetic field strength (H) (B-H curves) for several illustrative materials are shown. A first B-H curve 700 is shown for a first magnetic material, a second B-H curve 702 is shown for a second magnetic material, and a third B-H curve 704 is shown for a third magnetic material.

The magnetic flux density (B) increases in proportion to the magnetic field strength (H) until it reaches a certain value where it cannot increase any more becoming almost level and constant as the magnetic field strength (H) continues to increase. This is because there is a limit to the amount of magnetic flux density (B) that can be generated by a core (i.e., magnetic shield 108) as all the domains in the magnetic material are perfectly aligned. The point on the B-H curve where this occurs is called a magnetic saturation point. A first saturation point 706 indicates a magnetic saturation point of the first magnetic material that begins at about 3000 ampere-turns per meter (A/m). A second saturation point 708 indicates a magnetic saturation point of the second magnetic material that begins at about 3500 A/m.

Referring again to the illustrative embodiment of FIG. 1, magnetic shield 108 forms a circular cross section in the x-y plane and is elongated in the z-direction to radially surround an exterior of permanent magnet 104. Similar to permanent magnet 104, though magnetic shield 108 is shown in the illustrative embodiment as having a circular cross section, magnetic shield 108 may have any cross-sectional shape including a polygon as well as an ellipse. Core width 504 and a type of magnetic material of magnetic shield 108 may be selected based on the B-H curve of the magnetic material and the current conducted by inductive coil 106, which drives magnetic shield 108 in and out of magnetic saturation thereby changing the relative permeability $\mu_r$. Core width 504 and the type of magnetic material also may be selected to minimize hysteresis and eddy current losses in magnetic shield 108.

For illustration, the core power loss of magnetic shield 108 may be estimated using Steinmetz's equation $$P_v = K f^m B^n$$

where $P_v$ is a volumetric power density in watts (W)/kilogram, f is a frequency of the magnetic field in Hz, B is a magnitude of the flux density in Tesla, and K, m, and n are the Steinmetz constants that characterize the first magnetic material.

Figure 8:
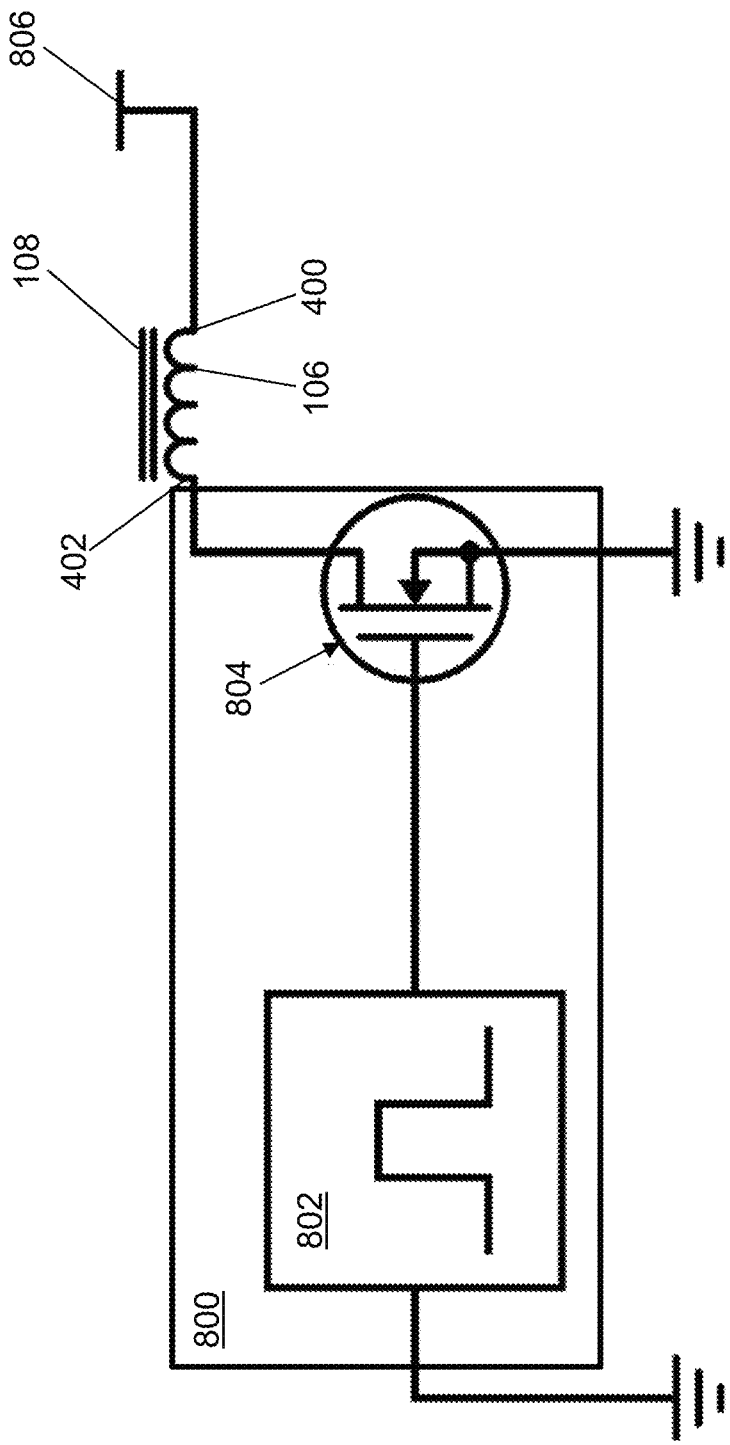
FIG. 8 depicts a control circuit for the transmitter of FIG. 1 in accordance with an illustrative embodiment.

FIG. 8 depicts a controller 800 for transmitter 100 in accordance with an illustrative embodiment. Controller 800 may include signal generator 802 connected to a switching circuit 804 such as a metal-oxide-semiconductor field-effect transistor (MOSFET). Signal generator 802 generates and provides a current signal to switching circuit 804 that is connected to second end 402 of inductive coil 106. First end 400 of inductive coil 106 may be connected to an input potential 806. To produce an AC magnetic field, permanent magnet 104 is rotated. To produce the largest AC magnetic field value, an angular momentum of permanent magnet 104 should be orthogonal to a magnetization direction as shown in the illustrative embodiment of FIG. 1. Thus, the rotational speed of motor shaft 112, and thereby of permanent magnet 104, provided by motor 110 defines a carrier frequency of the electromagnetic wave transmitted by transmitter 100.

A prototype of transmitter 100 was built. Motor 110 was a high speed brushed DC motor (BEMONOC 775 Series DC motor operated at 12 volts and providing 12,000 revolutions per minute). Motor 110 rotated permanent magnet 104 with a rotational speed to achieve a 150 Hz carrier frequency for the carrier wave. Permanent magnet 104 was a 1.905 centimeter (cm) diameter N42 spherical neodymium magnet offered by K&J Magnetic, Inc. of Pipersville, Pa., USA. A nylon cup was designed and machined to hold permanent magnet 104. The first magnetic material of magnetic shield 108 was MuMETAL (LK-110, fully annealed) with core width 504 equal to 0.254 millimeters (mm), hole width 600 equal to 7.5 cm, and height 502 equal to 8 cm. Inductive coil 106 was wound to form approximately 190 turns of 26 American wire gauge (AWG) wire on magnetic shield 108. For proof of concept and convenience, the specific dimensions for the magnetic shield 108 and inductive coil 106 were chosen empirically. Switching circuit 804 was an IRFB7730 MOSFET offered by Infineon Technologies Americas Corp. of El Segundo, Calif., USA. Controller 800 was an Arduino Nano microcontroller.

Using switching circuit 804, a current of 2.8 A was switched on and off by signal generator 802. The fields a distance away from the prototype transmitter 100 were measured with a calibrated IDR-210 Milligaussmeter manufactured by Integrity Design & Research Corporation of Essex Junction, Vt., USA. The resulting amplitude shift keying measured field was measured a distance of 34.3 cm away from transmitter 100. The carrier wave was modulated with a square wave having a frequency of 30 Hz.

Figure 9:
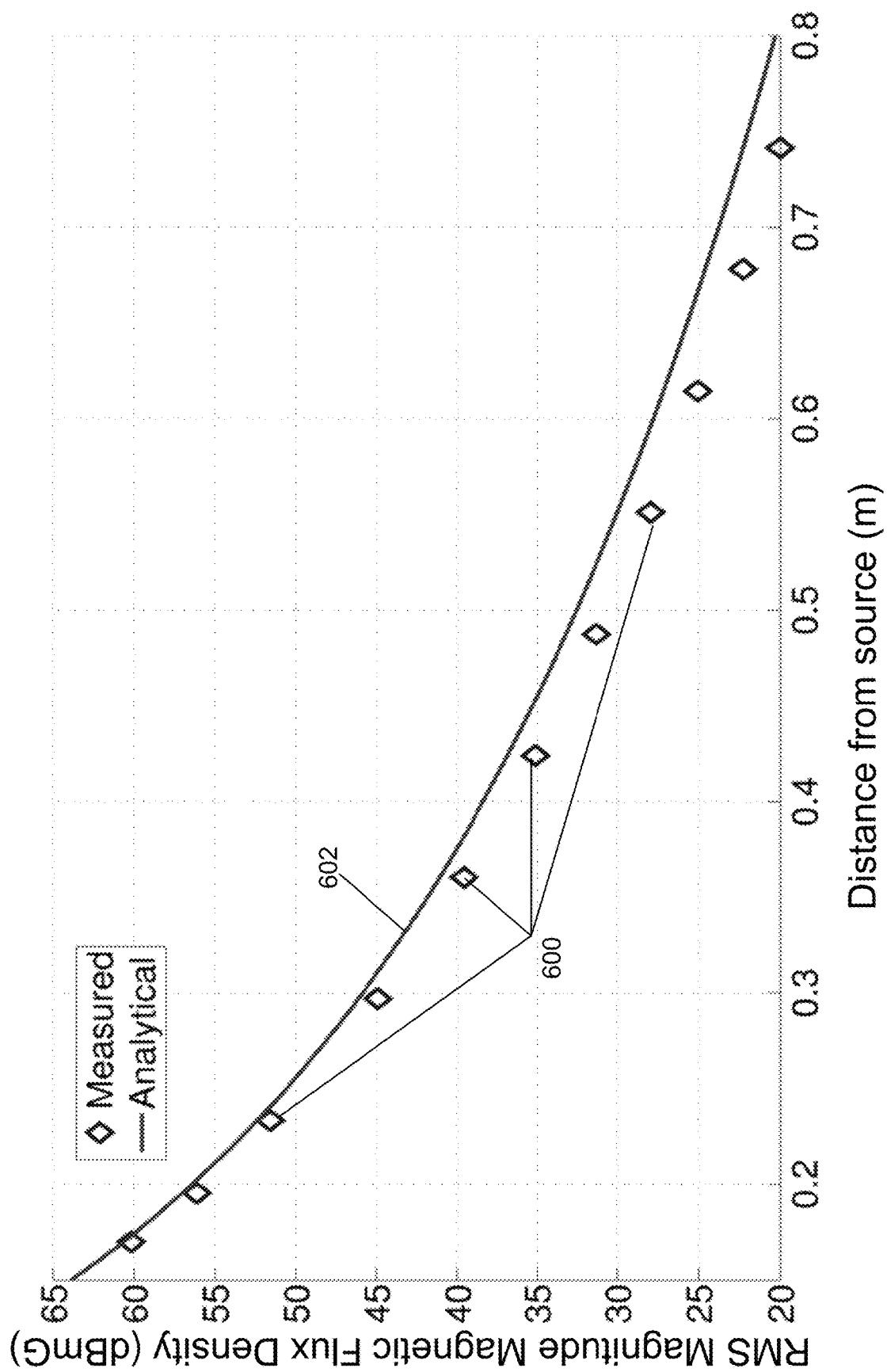
FIG. 9 shows a comparison between a measured and an analytically determined magnetic field strength of the transmitter of FIG. 1 as a function of a distance from the permanent magnet in accordance with an illustrative embodiment.

FIG. 9 shows a comparison between a measured and an analytically determined magnetic field strength of the prototype transmitter 100 as a function of the distance from permanent magnet 104. A field strength scatterplot 600 shows the measured magnitude of the radial magnetic field, and the field strength curve 602 shows the analytically expected magnitude of the radial magnetic field. The measurements were done in a plane orthogonal to the angular momentum of permanent magnet 104. Close agreement between theoretical (analytically expected) and experimental (measured) results is show in FIG. 9.

Figure 10:
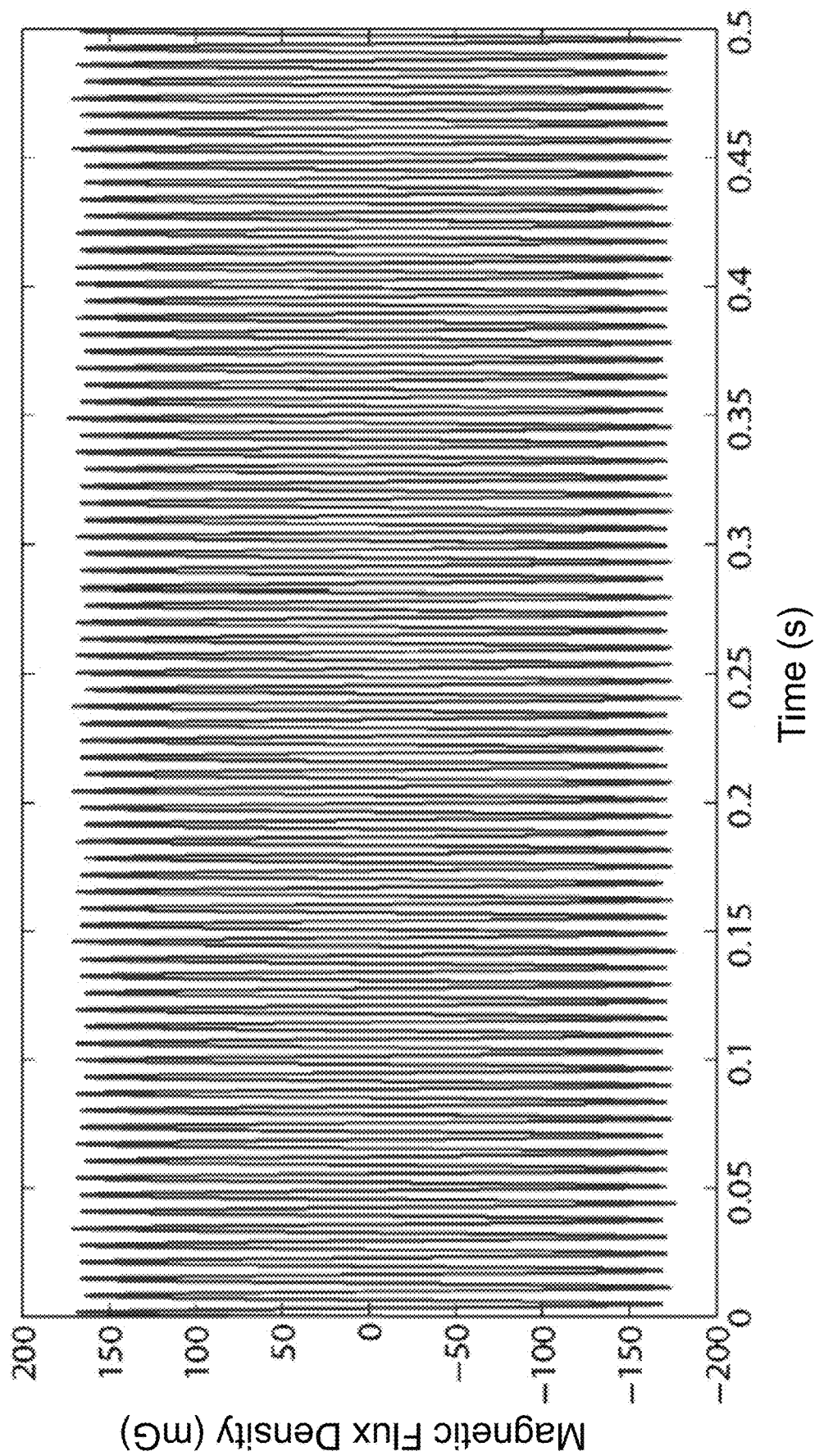
FIG. 10 shows a measured magnetic field strength of the transmitter of FIG. 1 as a function of time with no shielding effect in accordance with an illustrative embodiment.
Figure 11:
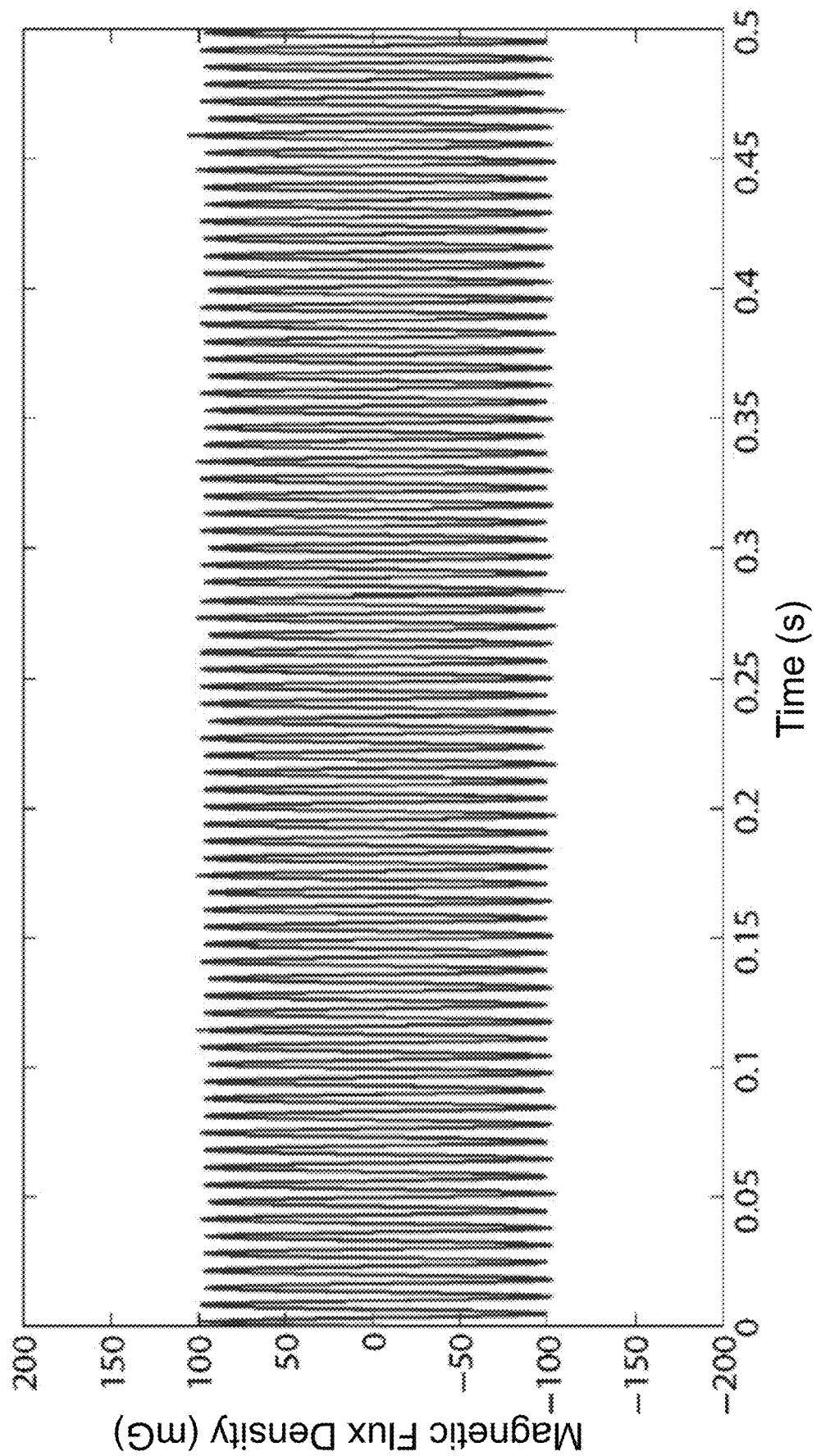
FIG. 11 shows the measured magnetic field strength of the transmitter of FIG. 1 as a function of time with shielding in effect in accordance with an illustrative embodiment.
Figure 12:
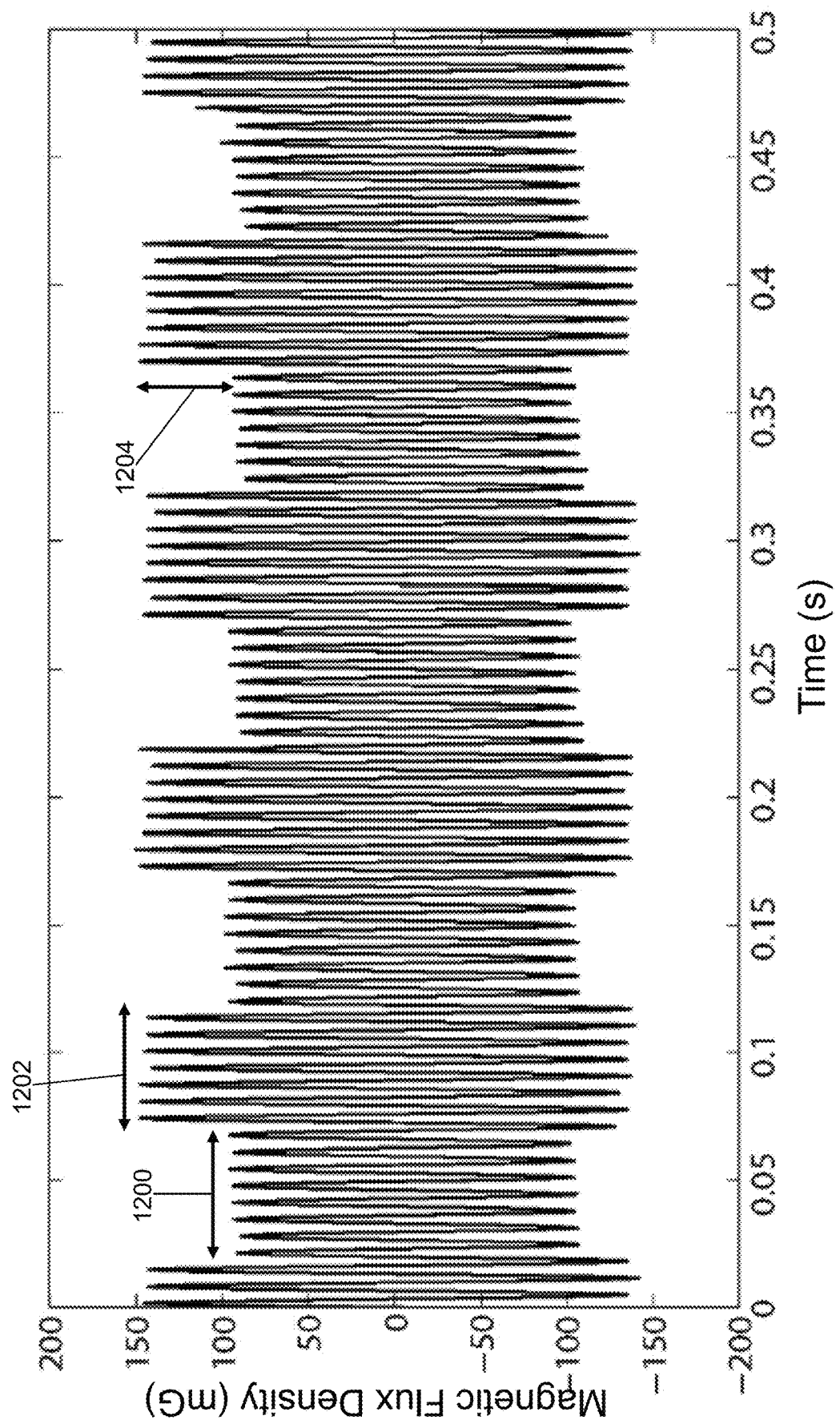
FIG. 12 shows the measured magnetic field strength of the transmitter of FIG. 1 as a function of time with the control circuit of FIG. 5 switching between the shielding in effect and not in effect in accordance with an illustrative embodiment.

To demonstrate modulation, magnetic shield 108 was placed over permanent magnet 104, and the current through inductive coil 106 was switched on and off. FIG. 10 shows the measured magnetic field strength of the prototype transmitter 100 as a function of time with no shielding placed over permanent magnet 104. FIG. 11 shows the measured magnetic field strength of the prototype transmitter 100 as a function of time with magnetic shield 108 placed around permanent magnet 104 and the current through inductive coil 106 switched off. FIG. 12 shows the measured magnetic field strength of the prototype transmitter 100 as a function of time with the control circuit of FIG. 8 switching magnetic shield 108 on for an on period 1200 and off for an off period 1202 using the current through inductive coil 106. A modulation depth 1204 of approximately 33% is shown between the on and off switching periods.

A bandwidth of transmitter 100 is determined by a rate at which the current can be switched on and off, and by the carrier frequency. The switching speed is determined by an LR time constant of inductive coil 106, as well as the design of the switching circuit. The on and off current switching time was measured to be 2 and 28 microseconds, respectively for the prototype signal generator 802. This switching period is much faster than that which can be achieved using any kind of mechanical modulation. Due to the fact that the switching speed is much faster than the period of the carrier frequency, the carrier frequency becomes the limiting factor in the bandwidth of transmitter 100. If higher data transmission rates are desired, higher carrier frequencies are produced, which involves spinning permanent magnet 104 faster.

Another important factor to consider is that often the bandwidth of a communication system is dependent on a bandwidth of a receiver. A narrowband receiver is often used in order to have a high signal-to-noise ratio (SNR). For a carrier frequency that is realistically achievable by spinning permanent magnet 104, the bandwidth of transmitter 100 surpasses that of a conventional MI transmitter. Due to the fact that the switching speed is much faster than the period of the carrier wave, bandwidths that are up to approximately 100% of the carrier frequency are possible.

Figure 13:
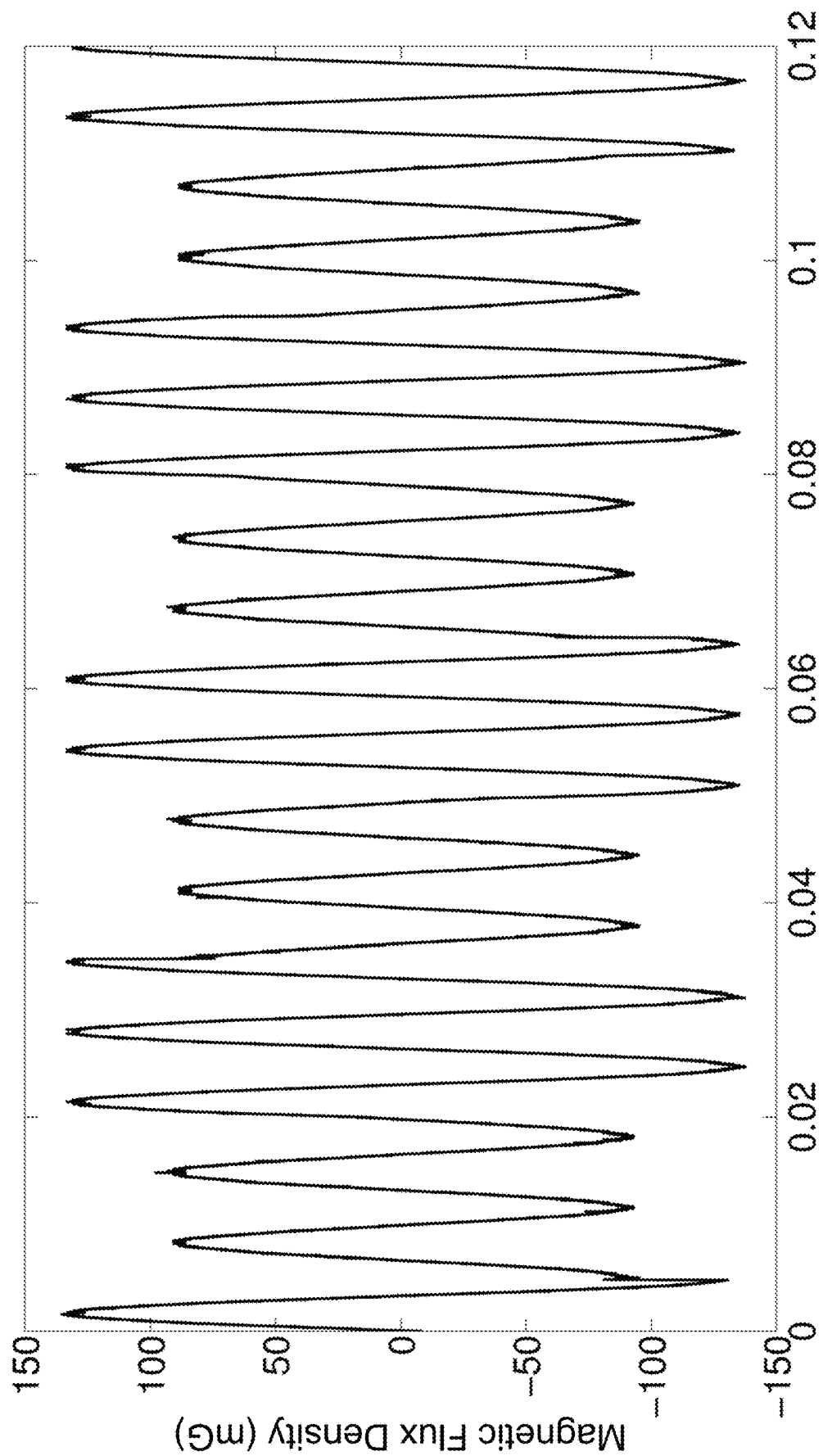
FIG. 13 shows the measured magnetic field strength of the transmitter of FIG. 1 as a function of time with the control circuit of FIG. 5 switching between the shielding in effect and not in effect in accordance with another illustrative embodiment.

FIG. 13 shows the measured magnetic field strength of the prototype transmitter 100 as a function of time with the control circuit of FIG. 8 switching magnetic shield 108 on and off with a 30 Hz square wave to provide a data rate of 60 bits/sec, yielding a large fractional bandwidth of approximately 40% (2×30/150=40%). A lower fractional bandwidth is shown to clearly view the modulation.

In the prototype transmitter 100, inductive coil 106 needed 2.8 A at 12 V to saturate magnetic shield 108, which corresponds to an average coil power consumption of 17 W given a 50 percent duty cycle for switching circuit 804. For ease of prototyping, a small permanent magnet and a low volume of copper for inductive coil 106 was used. Because of this, the efficiency of the prototype transmitter 100 is low. However, based on experimental results, a high efficiency can be obtained using transmitter 100. Due to a low core loss in magnetic shield 108, ohmic losses in inductive coil 106 are the main source of loss, which means that using a large volume of copper will dramatically increase the efficiency of transmitter 100. For example, using a multi-layer inductive coil 106 wound 1,000 turns with 20 strands of 28 AWG wire can reduce the power consumption of the prototype transmitter 100 from 17 W to 0.25. A larger and more powerful permanent magnet 104 could be rotated, yielding a much higher efficiency.

Lower modulation depths may be sufficient for communication purposes. It was experimentally observed that changing the current through inductive coil 106 of the prototype transmitter 100 by 0.5 A produced a modulation depth of 11% in the received field. This modification to the operation of the prototype transmitter 100 can reduce the average modulation power consumption from 17 W to 0.54 W. Lowering the current and using a thicker wire for inductive coil 106 can further decrease the power consumption of inductive coil 106.

With a high-speed motor, the carrier frequency could easily be scaled to 575 Hz. The power consumption of the system can be nearly the same as the 150 Hz case because inductive coil 106 only contains the low frequency message signal. Furthermore, the core loss for a sinusoidal signal at 500 Hz with a magnitude great enough to saturate magnetic shield 108, yields a core loss of only 80 milliwatts (mW).

Figure 14:
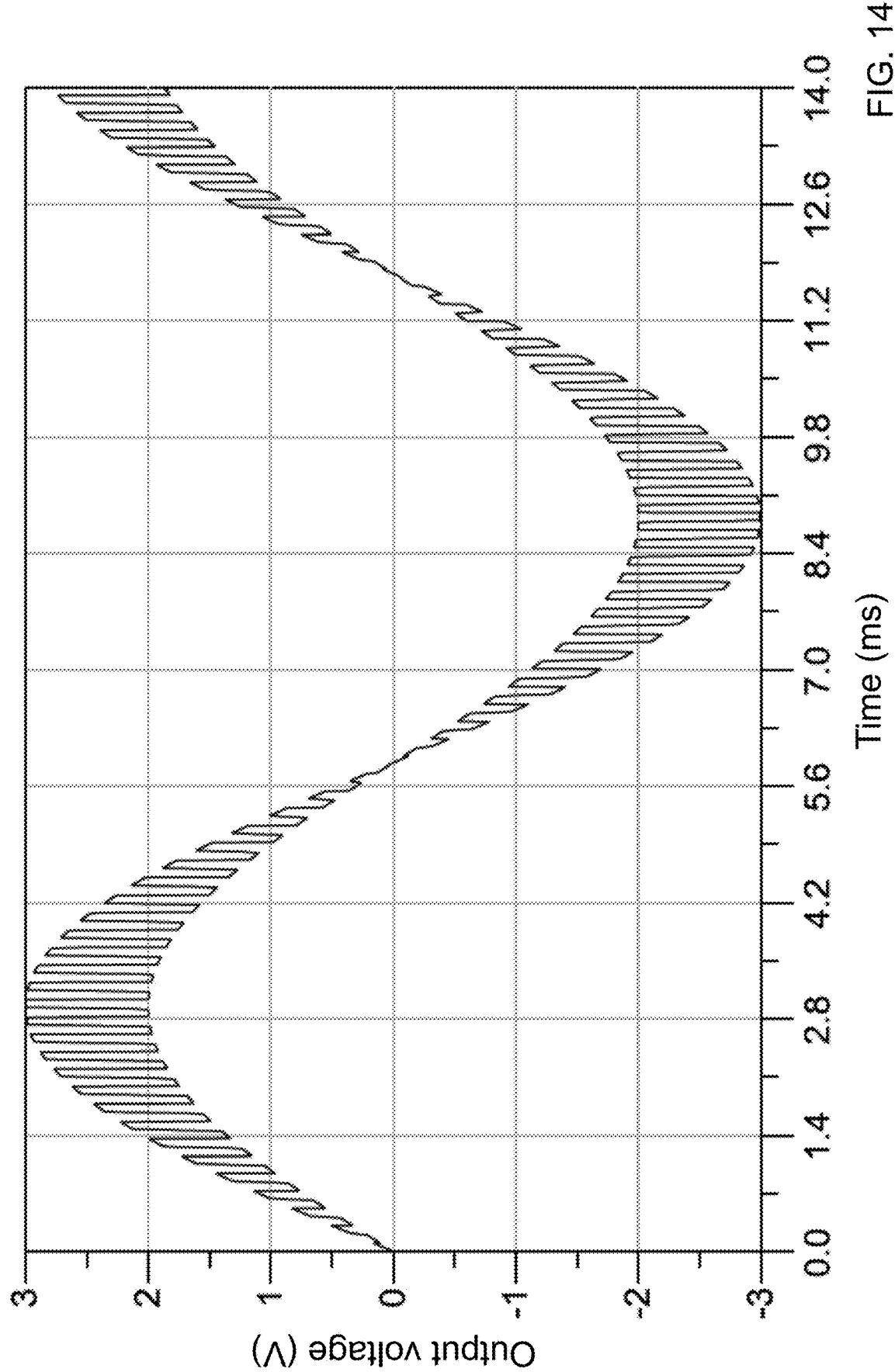
FIG. 14 shows an illustrative amplitude modulated wave output from the transmitter of FIG. 1 in accordance with an illustrative embodiment.

Radio communication systems modulate the amplitude, frequency, or phase of a carrier wave to convey information. Conventionally, the carrier wave is modulated at a rate lower than the carrier frequency due to the bandwidth limitations of power amplifiers. However, transmitter 100 is capable of amplitude modulation at a rate that is faster than the carrier frequency. FIG. 14 shows an illustrative amplitude modulated wave output from transmitter 100. An 85 Hz carrier wave is amplitude modulated at 5 kHz. In this way, a high frequency waveform can be generated, even though permanent magnet 104 is spinning at a slow speed. Modulating the carrier wave at higher frequencies has the following potential advantages. In general, less noise exists at higher frequencies. Because higher frequencies can be generated, a higher SNR can be achieved at a receiver. Higher SNR means an increase in a maximum communication range of transmitter 100. Because the modulation is at much higher frequencies, higher data rates are possible.

This higher frequency can be produced by modulating a non-rotating static magnetic field produced by permanent magnet 104. As a result, permanent magnet 104 need not be rotated by motor shaft 112 of motor 110, which simplifies construction and operation of transmitter 100, reduces the cost to manufacture, further reduces the power consumption, and avoids any limitation due to a need to rotate a large magnet. With this technique, frequencies in the VLF range can be produced (3-30 kHz) that can bounce off the ionosphere, which allows for long distance communication.

Figure 15:
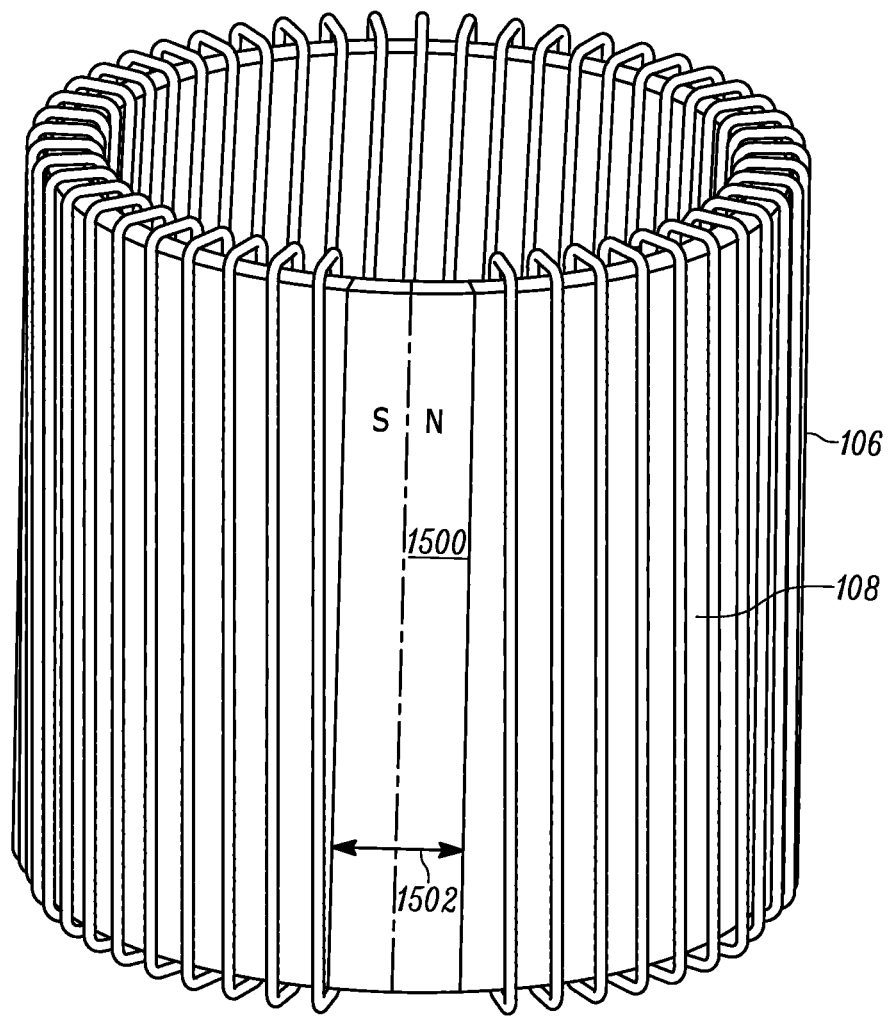
FIG. 15 depicts a perspective side view of a biased magnetic core of the transmitter of FIG. 1 in accordance with an illustrative embodiment.

FIG. 15 depicts a perspective side view of a second permanent magnet 1500 mounted to and within magnetic shield 108 to replace a portion of magnetic shield 108. Inductive coil 106 is not wound around second permanent magnet 1500. A magnetization direction 1502 of second permanent magnet 1500 is in a circumferential direction around magnetic shield 108. The efficiency is increased by using second permanent magnet 1500 to bias magnetic shield 108 at an optimum point on the B-H curve of the first magnetic material. If the shield is biased at a point on the B-H curve just before saturation, less current is needed to push magnetic shield 108 into saturation.

Mechanical frequency modulation (FM) modulation of the carrier wave can be accomplished by mechanically changing the rotational speed of permanent magnet 104. Instead of varying the current through inductive coil 106, controller 800 can be configured to change the rotational speed of motor shaft 112. The efficiency of such a transmitter depends on an efficiency of motor 110 and the power required to modulate the transmitter. If the magnet is supported by very low friction bearings, only a small amount of power may be required to sustain the rotation assuming a constant rotational speed. However, to modulate the carrier wave by changing the rotational speed of permanent magnet 104 suffers from low bandwidth due to the mechanical inertia of permanent magnet 104. In addition, even the most modest bit rates can result in low efficiencies due to the high rotational speeds required.

Figure 16:
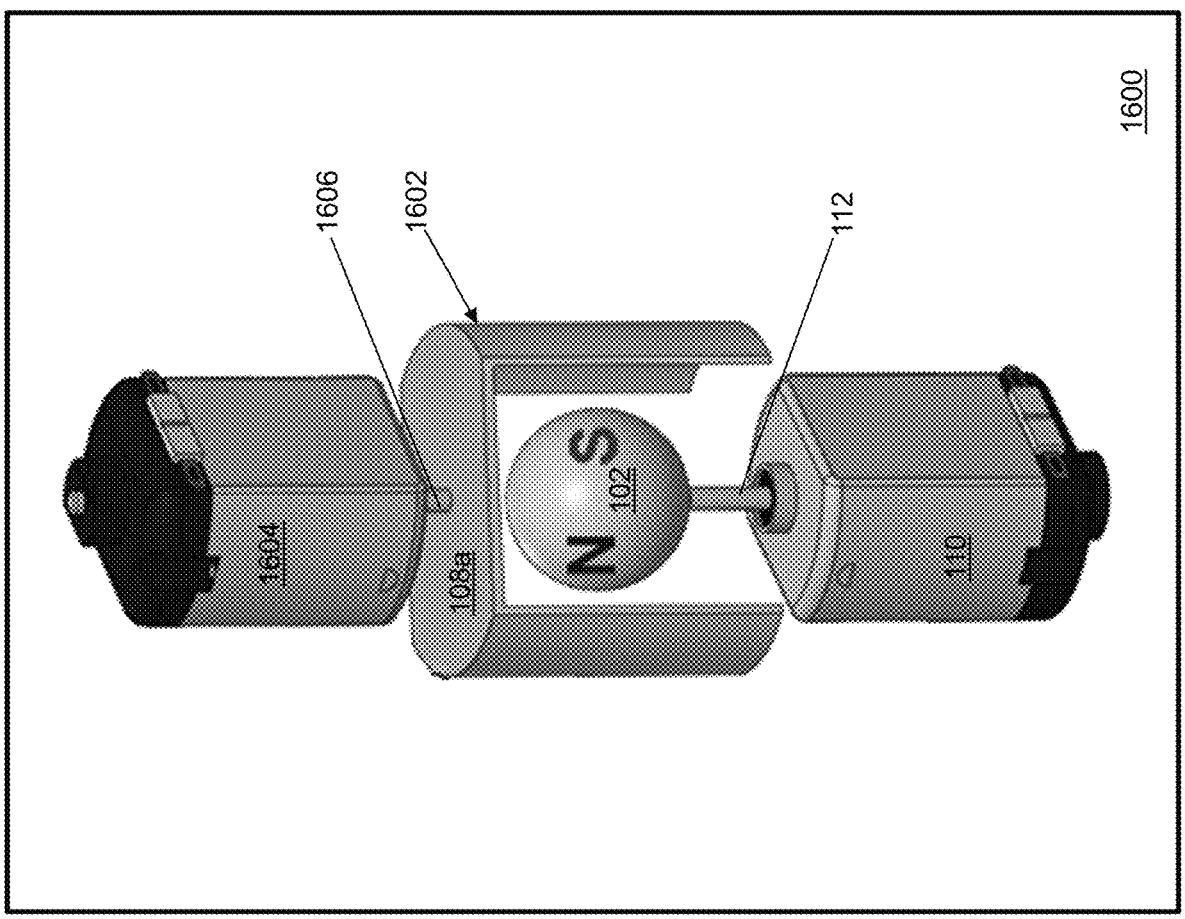
FIG. 16 depicts a perspective side view of a second transmitter in accordance with an illustrative embodiment.

In an alternative embodiment, referring to FIG. 16, a second transmitter 1600 is shown in accordance with an illustrative embodiment. Second transmitter 1600 may include signal generator 802, a second MI transmit antenna 1602, motor 110, motor shaft 112, a second motor 1604, and a second motor shaft 1606. Second MI transmit antenna 1602 may include permanent magnet 104 and a second magnetic shield 108a. Permanent magnet 104 is mounted to motor shaft 112 to rotate with motor shaft 112 under control of motor 110. Second magnetic shield 108a is mounted to second motor shaft 1606 to rotate with second motor shaft 1606 under control of second motor 1602. The motor controller may also control an operation of second motor 1602, for example, a rotational speed of second motor shaft 1606.

Second magnetic shield 108a is formed as a shutter that only partially circumferentially surrounds permanent magnet 104. Second magnetic shield 108a is mounted to second motor 1602 to rotate or to vibrate. If second magnetic shield 108a has much less moment of inertia than permanent magnet 104, greater bandwidth and efficiency as compared to mechanical FM modulation is possible. By spinning second magnetic shield 108a in or out of phase with permanent magnet 104, the fields from permanent magnet 104 can be modulated.

Figure 17:
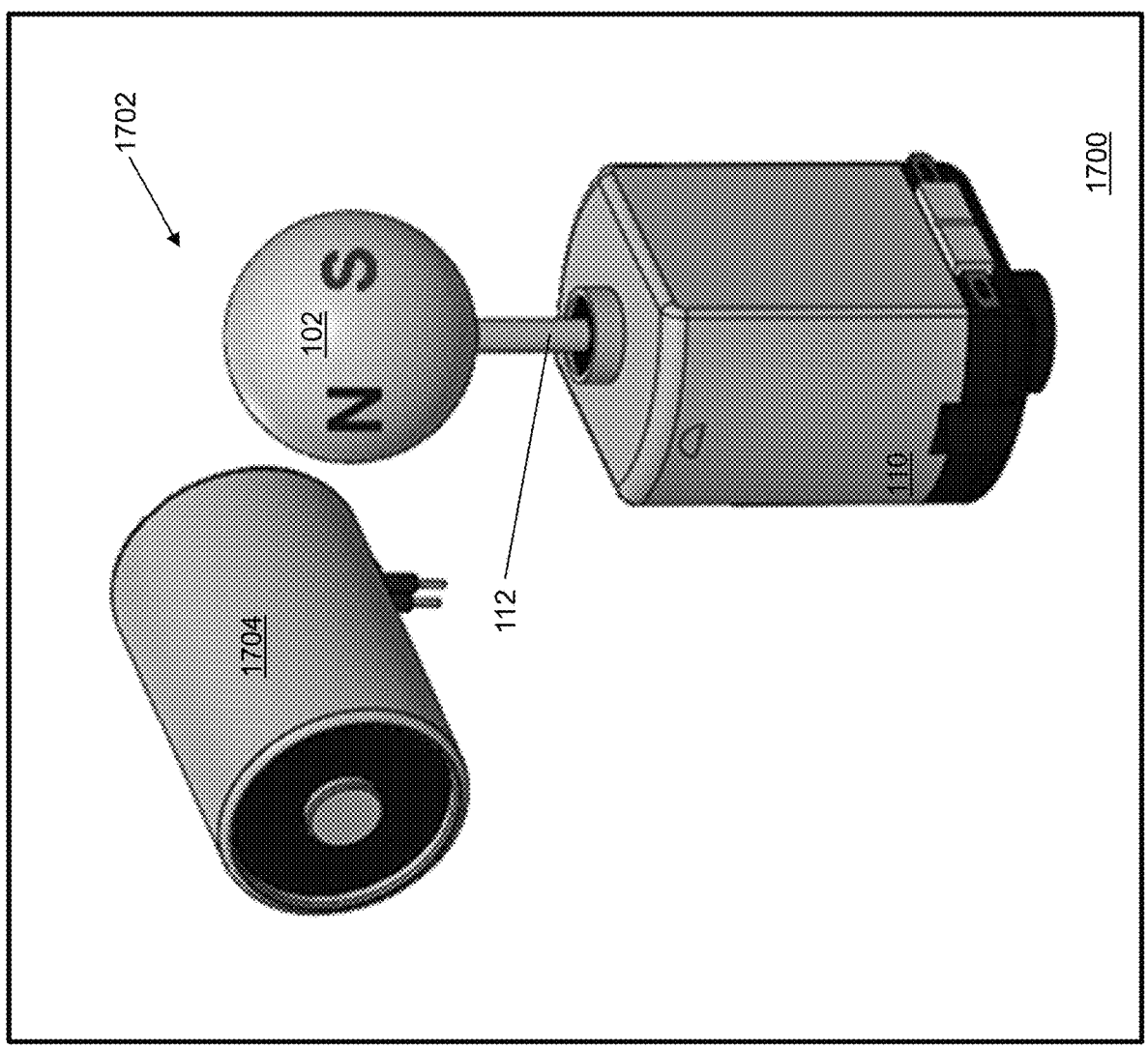
FIG. 17 depicts a perspective side view of a third transmitter in accordance with an illustrative embodiment.

In another alternative embodiment, referring to FIG. 17, a third transmitter 1700 is shown in accordance with an illustrative embodiment. Third transmitter 1700 may include signal generator 802, a third MI transmit antenna 1702, motor 110, and motor shaft 112. Third MI transmit antenna 1702 may include permanent magnet 104 and an electromagnet 1704. Permanent magnet 104 is mounted to motor shaft 112 to rotate with motor shaft 112 under control of motor 110.

Electromagnet 1704 is an AC current carrying solenoid that can be used to amplitude modulate the carrier wave from permanent magnet 104 when it is spinning. Third transmitter 1700 may produce much greater bandwidth than mechanical FM modulation. However, the bandwidth may be the same as that of a conventional MI transmitter. Electromagnet 1704 could be phase or amplitude modulated. The fields from electromagnet 1704 only need to modulate the carrier wave. However, if large modulation depth is desired, the efficiency of third transmitter 1700 essentially becomes no different than that of a conventional MI transmitter.

Figure 18:
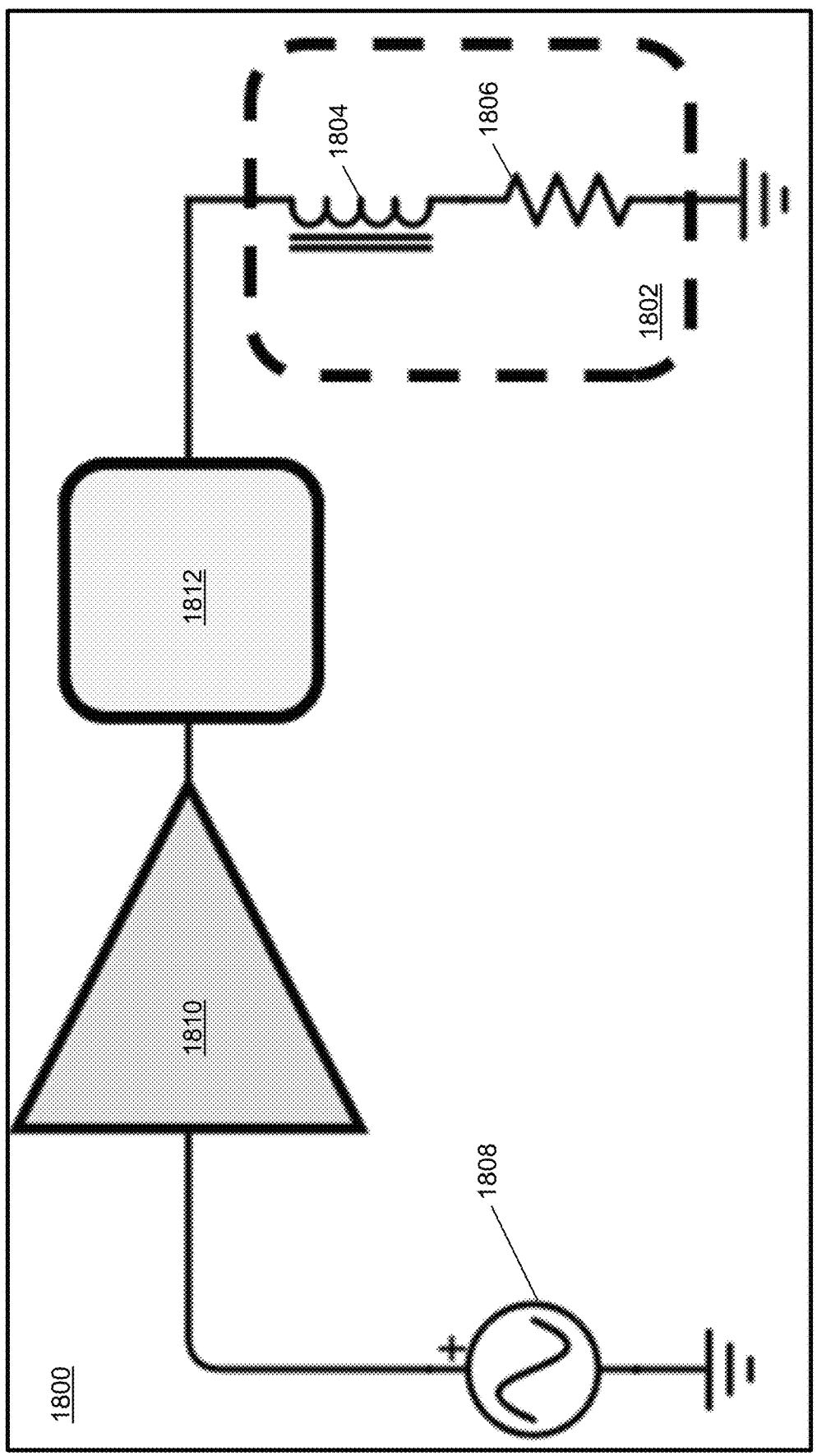
FIG. 18 depicts a block diagram of a fourth transmitter in accordance with an illustrative embodiment.

In yet another alternative embodiment, referring to FIG. 18, a fourth transmitter 1800 is shown in accordance with an illustrative embodiment. Fourth transmitter 1800 may be similar to transmitter 100 or second transmitter 1600 except permanent magnet 104 may be replaced with an AC electromagnet 1802. AC electromagnet 1802 need not be mounted to motor shaft 112 to rotate with motor shaft 112 under control of motor 110. AC electromagnet 1802 includes a ferromagnetic core with a coil wound around it to generate a magnetic field when a current is applied to the coil. The ferromagnetic core may be made, for example, of a ferrite, silicon steel, etc. AC electromagnet 1802 has an associated inductance 1804 and resistance 1806. An AC power source 1808 may provide power to a power amplifier 1810 to power AC electromagnet 1802. A matching network 1812 matches an impedance to AC electromagnet 1802 to generate a maximum magnetic moment from AC electromagnet 1802. AC electromagnet 1802 may be oriented in any direction although one may be preferable. The coil wound around the ferromagnetic core can be made from any conductor including superconducting wire possibly with cryogenic cooling. AC electromagnet 1802 can be optimized for high efficiency because no modulation is needed.

Conventional MI transmitters use a capacitor to form a resonant circuit with the transmitting coil. However, the resonant transmitter has a finite bandwidth, producing limits on the maximum bit rate that can be transmitted. However, using transmitter 100, the electrical excitation of inductive coil 106 only contains the low frequency digital message signal. If the turn-on and turn-off time of the current through inductive coil 106 is very small (much smaller than the carrier frequency), very large fractional bandwidths are achieved as shown in FIGS. 13 and 14.

Transmitter 100 can be used for underground and underwater communications and may be especially advantageous for inclusion in a small portable MI phone for divers and mine workers. In addition to applications in portable communication, transmitter 100 can also be used as a sensor such as those needed for bridge scouring or indoor localization/navigation. As discussed, transmitter 100 does not require a change in rotational speed of motor shaft 112 or even rotation at all depending on the modulation technique used and can be implemented with increased efficiency and bandwidth compared to existing MI transmitters.

As used in this disclosure, the term "mount" includes join, unite, connect, couple, associate, insert, hang, hold, affix, attach, fasten, bind, paste, secure, bolt, screw, rivet, solder, weld, glue, adhere, form over, layer, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact). Elements referenced as mounted to each other herein may further be integrally formed together, for example, using a molding process as understood by a person of skill in the art. As a result, elements described herein as being mounted to each other need not be discrete structural elements. The elements may be mounted permanently, removably, or releasably.

As used in this disclosure, the term "connect" includes join, unite, mount, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "connected on" and "connected to" include any interior or exterior portion of the element referenced. Elements referenced as connected to each other herein may further be integrally formed together. As a result, elements described herein as being connected to each other need not be discrete structural elements. The elements may be connected permanently, removably, or releasably.

Use of directional terms, such as top, bottom, right, left, front, back, upper, lower, horizontal, vertical, behind, etc. are merely intended to facilitate reference to the various surfaces of the described structures relative to the orientations illustrated in the drawings and are not intended to be limiting in any manner unless otherwise indicated.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A magneto-inductive transmit antenna comprising:
a shield including a body formed of a magnetic material;
a magnetic field source mounted interior of a first side of the shield, wherein the shield at least partially arcs around the magnetic field source; and
a coil wrapped around the body of the shield to define a number of turns that spiral around the body, the coil configured to conduct a current therethrough;
wherein the magnetic material is configured to exhibit a change in permeability based on the current conducted through the coil when the current is conducted through the coil, wherein the change in permeability is configured to modulate a magnetic field of the magnetic field source, wherein the magnetic field is modulated relative to a second side of the shield opposite the first side when the permeability is changed; wherein the shield, the magnetic field source and the coil form the magneto-inductive transmit antenna.

2. The magneto-inductive transmit antenna of claim 1, wherein the magnetic field is frequency modulated.

3. The magneto-inductive transmit antenna of claim 1, wherein the magnetic field is amplitude modulated.

4. The magneto-inductive transmit antenna of claim 1, further comprising a permanent magnet mounted to the shield.

5. The magneto-inductive transmit antenna of claim 4, wherein the body of the shield has a toroid shape.

6. The magneto-inductive transmit antenna of claim 5, wherein a direction of a magnetic flux from the permanent magnet is in a circumferential direction relative to the toroid shape of the body of the shield.

7. The magneto-inductive transmit antenna of claim 4, wherein the coil is not wound around the permanent magnet.

8. The magneto-inductive transmit antenna of claim 4, wherein the permanent magnet is mounted within a portion of the shield.

9. The magneto-inductive transmit antenna of claim 1, wherein the magnetic material has a permeability value greater than $1.25663753 \times 10^{-6}$ Henries per meter.

10. The magneto-inductive transmit antenna of claim 1, wherein the shield has a toroid shape, wherein the magnetic field source is positioned within a hole formed by the toroid shape.

11. The magneto-inductive transmit antenna of claim 1, wherein the magnetic field source is a diametrically magnetized permanent magnet.

12. The magneto-inductive transmit antenna of claim 11, wherein the diametrically magnetized permanent magnet is diametrically magnetized orthogonal to an axis of rotation.

13. The magneto-inductive transmit antenna of claim 1, wherein the magnetic field source is an alternating current electromagnet.

14. A transmitter comprising:
a signal generator configured to generate a signal;
a motor shaft;
a motor mounted to rotate the motor shaft when the transmitter is used; and a magneto-inductive transmit antenna comprising a shield including a body formed of a magnetic material;
a magnetic field source mounted interior of a first side of the shield and to the motor shaft to rotate with the motor shaft, wherein the shield at least partially arcs around the magnetic field source; and
a coil wrapped around the body of the shield to define a number of turns that spiral around the body, the coil configured to conduct a current therethrough based on the generated signal;
wherein the magnetic material is configured to exhibit a change in permeability based on the current conducted through the coil when the current is conducted through the con, wherein the change in permeability is configured to modulate a magnetic field of the permanent magnet, wherein the magnetic field is modulated relative to a second side of the shield opposite the first side when the permeability is changed; wherein the shield, the magnetic field source and the coil form the magneto-inductive transmit antenna.

15. The transmitter of claim 14, further comprising a permanent magnet mounted to the body of the shield.

16. The transmitter of claim 14, wherein the body of the shield has a toroid shape.

17. The transmitter of claim 14, wherein the motor is configured to rotate the permanent magnet at a constant rate of rotation.

18. The transmitter of claim 17, wherein the constant rate of rotation is approximately equal to a carrier frequency of the generated signal when the transmitter is used.

19. The transmitter of claim 17, wherein the constant rate of rotation is less than a carrier frequency of the generated signal when the transmitter is used.

20. The transmitter of claim 14, wherein the magnetic field source is a diametrically magnetized permanent magnet that is diametrically magnetized orthogonal to an axis of rotation of the diametrically magnetized permanent magnet.

* * * * *

UNITED STATES PATENT AND TRADEMARK OFFICE
CERTIFICATE OF CORRECTION

PATENT NO. : 10,830,918 B2
APPLICATION NO. : 16/030364
DATED : November 10, 2020
INVENTOR(S) : Nathan Daniel Strachen et al.

Page 1 of 1

It is certified that error appears in the above-identified patent and that said Letters Patent is hereby corrected as shown below:

On the Title Page

Item (71):
Delete the phrase "Applicant: Wisconsin Alumni Research Foundation, Madison, MI (US)" and replace with --Applicant: Wisconsin Alumni Research Foundation, Madison, WI (US)--.

In the Claims

Claim 14, Column 12, Lines 35-36:
Delete the phrase "when the current is conducted through the con," and replace with --when the current is conducted through the coil,--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*